United States Patent
Ho

(10) Patent No.: US 9,691,302 B2
(45) Date of Patent: Jun. 27, 2017

(54) RECORDING APPARATUS FOR PACKAGE UNPACKING RECORDATION

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventor: Sin-In Ho, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 186 days.

(21) Appl. No.: 14/500,976

(22) Filed: Sep. 29, 2014

(65) Prior Publication Data

US 2016/0019819 A1    Jan. 21, 2016

(30) Foreign Application Priority Data

Jul. 18, 2014    (TW) .............................. 103124697 A

(51) Int. Cl.
| | |
|---|---|
| *B42F 23/00* | (2006.01) |
| *G09F 3/02* | (2006.01) |
| *G06Q 10/08* | (2012.01) |

(52) U.S. Cl.
CPC .............. *G09F 3/02* (2013.01); *G06Q 10/08* (2013.01); *G09F 2003/0202* (2013.01); *G09F 2003/023* (2013.01); *G09F 2003/0252* (2013.01)

(58) Field of Classification Search
CPC .................................................. B65B 63/005
See application file for complete search history.

(56) References Cited

U.S. PATENT DOCUMENTS

| | | | | | |
|---|---|---|---|---|---|
| 3,826,222 | A | * | 7/1974 | Romick | .................... G09F 3/00 |
| | | | | | 116/200 |
| 4,122,947 | A | * | 10/1978 | Falla | ...................... A61G 12/00 |
| | | | | | 206/569 |

(Continued)

FOREIGN PATENT DOCUMENTS

| | | |
|---|---|---|
| JP | 3064280 B1 | 7/2000 |
| TW | 503203 B | 9/2002 |

(Continued)

OTHER PUBLICATIONS

Office Action dated Jun. 27, 2016 of the corresponding Taiwan patent application.

*Primary Examiner* — Kristina N Junge
(74) *Attorney, Agent, or Firm* — Chun-Ming Shih; HDLS IPR SERVICES

(57) ABSTRACT

A recording apparatus comprises a plurality of supporting materials, a plurality of labels, and an unpacking recordation form. The supporting materials supports and fixes components of a specific device. The amount of the labels is at least the amount of the supporting materials plus two, wherein the labels comprises a starting-label and an ending-label pasted on the unpacking recordation form. The unpacking recordation form comprises several recording columns between the starting-label and the ending-label, wherein the amount of the recording columns is corresponding to that of the supporting materials. When unpacking the supporting materials from the device, the labels is removed from the supporting materials to paste to the recording columns. Therefore, user can determine if all supporting materials in (Continued)

the device are unpacked completely by checking if all of the recording columns are pasted by the labels.

10 Claims, 10 Drawing Sheets

(56) References Cited

U.S. PATENT DOCUMENTS

| | | | | |
|---|---|---|---|---|
| 4,340,810 | A * | 7/1982 | Glass | B42D 12/00 235/375 |
| 5,046,609 | A * | 9/1991 | Mangini | G09F 3/0288 206/232 |
| 5,833,057 | A * | 11/1998 | Char | B01L 9/06 206/204 |
| 8,590,191 | B2 * | 11/2013 | Waltersdorf | A44C 5/0015 283/75 |
| 2004/0088132 | A1 * | 5/2004 | Schvaneveldt | A61G 12/00 702/122 |
| 2005/0077201 | A1 * | 4/2005 | Liao | B65D 81/113 206/521 |
| 2007/0058990 | A1 * | 3/2007 | Weaver | G03G 15/502 399/9 |
| 2012/0145589 | A1 * | 6/2012 | Macinnes | A61M 25/00 206/571 |

FOREIGN PATENT DOCUMENTS

| | | |
|---|---|---|
| TW | 200642928 A | 12/2006 |
| TW | 1341280 B | 5/2011 |

* cited by examiner

RECORDING APPARATUS FOR PACKAGE UNPACKING RECORDATION

BACKGROUND OF THE INVENTION

1. Field of the Invention

The invention related to a recording apparatus, and in particular to a recording apparatus for a recordation to show if all materials in a specific device are unpacked completely.

2. Description of Prior Art

Following the development of technology, the newest electronic devices and machines equip more and more powerful abilities, however, the powerful abilities also increase the complexity of the electronic devices and the machines.

As mentioned above, a device is usually constituted by a plurality of components, the size, shape, arranged position, and action of each of the plurality of components are defined in advance for different reasons or functions. However, those components may drops or be damage because of the shake or impact during the transportation of the device. For preventing the above problem, the operators usually apply some suitable supporting materials for supporting, fixing, separating or locating the components of the device.

Generally, the amount of the supporting materials is corresponding to the amount of the components in the device. If the amount of the components increase, the amount of the supporting materials will increase, too. Furthermore, a part of the supporting materials is smaller than others, and other part of the supporting materials is arranged in some inconspicuous position of the device, as a result, user tends to miss those supporting materials. If the user boots the device before all of the supporting materials in the device are unpacked from the device, the device may not work after booting, furthermore, the device may break down.

The conventional device usually attaches a specification for the user to teach how to unpack all of the supporting materials in the device accurately and make the device works normally. However, even the specification is attached for the user, the user may still miss some small supporting materials, or miss some supporting materials arranged in the inconspicuous position of the device. Else, if the device is upgraded or modified (the components in the device may increase, reduce, or the arranged positions of the components may be changed), the amount and the arranged positions of the supporting materials are also changed. Therefore, the specification needs to be modified and re-printed, then the cost of the device will increase, and the resource is wasted.

SUMMARY OF THE INVENTION

According to the above descriptions, the invention provides a recording apparatus for package unpacking recordation, which records if all supporting materials in a device are unpacked completely when unpacking a package of the device.

In an embodiment of the invention, the recording apparatus comprises a plurality of supporting materials, a plurality of labels, and an unpacking recordation form. The supporting materials is used to support and fix components of a specific device. The amount of the labels is at least the amount of the supporting materials plus two, wherein the labels comprises a starting-label and an ending-label pasted on the unpacking recordation form. The unpacking recordation form comprises a plurality of recording columns between the starting-label and the ending-label, wherein the amount of the recording columns is equal to the amount of the supporting materials. When unpacking the supporting materials from the device, the labels is removed from the supporting materials to paste to the recording columns of the unpacking recordation form. Therefore, user can determine if all supporting materials in the device are unpacked completely or not by checking if all of the recording columns are pasted by the labels.

Operators in this invention records supporting materials arrangement by pasting labels during a packing procedure of the device, and if user receives the packed device, the user can record unpacking progress by removing the labels pasted on the supporting materials to paste to the unpacking recordation form during an unpacking procedure. The advantage of the invention is that the user can determine if all supporting materials in the device are unpacked completely by checking if recording columns between the starting-label and the ending-label of the unpacking recordation form are pasted by the labels. Therefore, the user is prevented from booting the device before the supporting materials in the device are unpacked completely and causes the device to broke.

DETAILED DESCRIPTION OF THE INVENTION

Figure 1A:
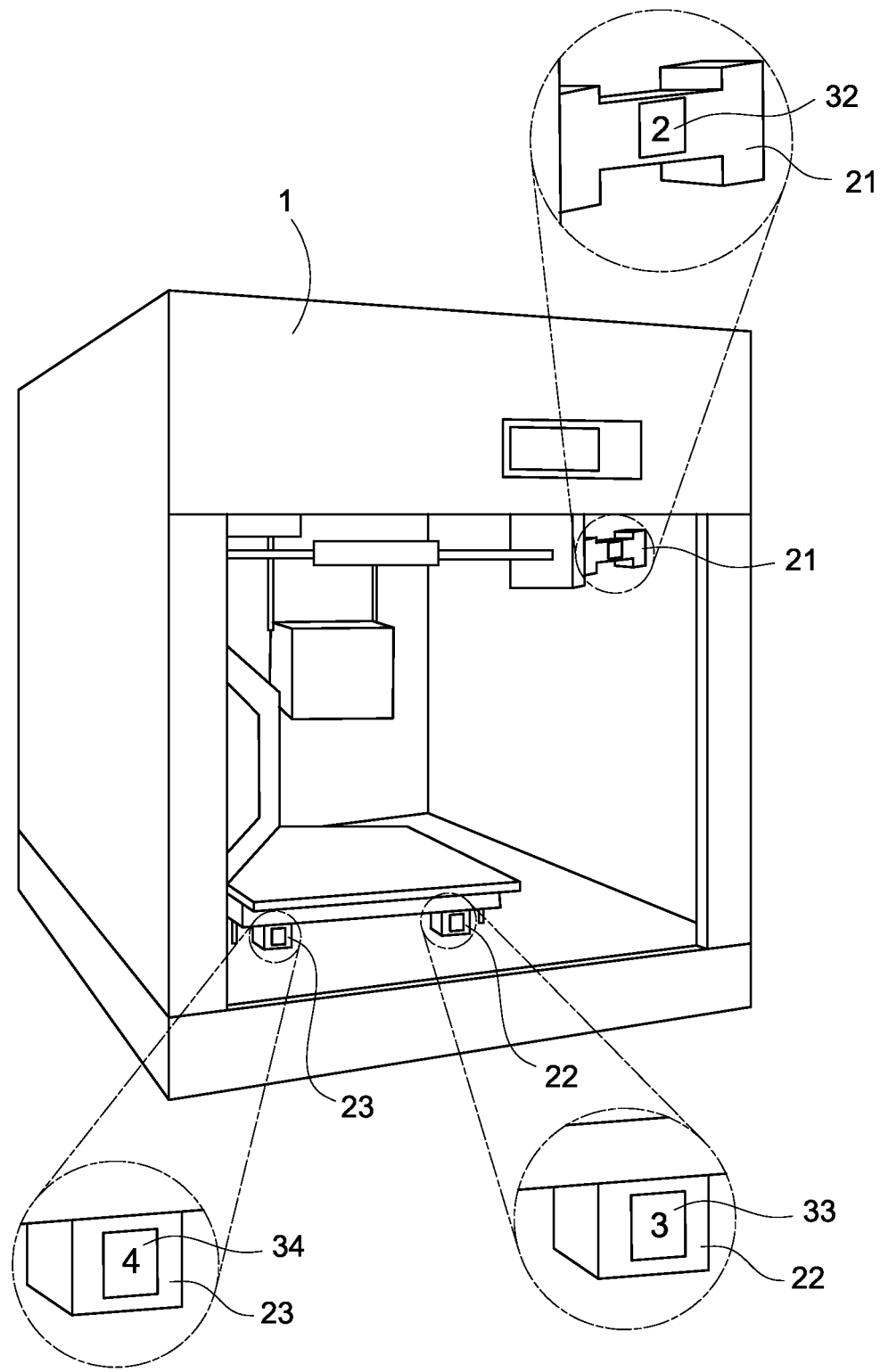
FIG. 1A is a perspective view of supporting materials of a first embodiment according to the present invention.

FIG. 1A is a perspective view of supporting materials of a first embodiment according to the present invention. FIG.

1B is a perspective view of supporting materials of a second embodiment according to the present invention. The present invention discloses a recording apparatus for package unpacking recordation, which helps a user to record an unpacking progress about a plurality of supporting materials arranged in a device while unpacking the package of the device 1, and the user can avoid missing any supporting materials in the device 1.

As shown in FIG. 1A, a plurality of supporting materials 21, 22, 23 is arranged in the device 1 to support and to fix components in the device 1, and the components (for example, motors, gear wheels, indicators, etc.) in the device 1 are protected by the supporting materials 21, 22, 23 from displacement or damage because of the transportation of the device 1. In this embodiment, the device 1 is a 3D printer. However, the device 1 can be any electronic device or machine comprising several components internally and needing the plurality of supporting materials to support and to fix the internal components.

Figure 1B:
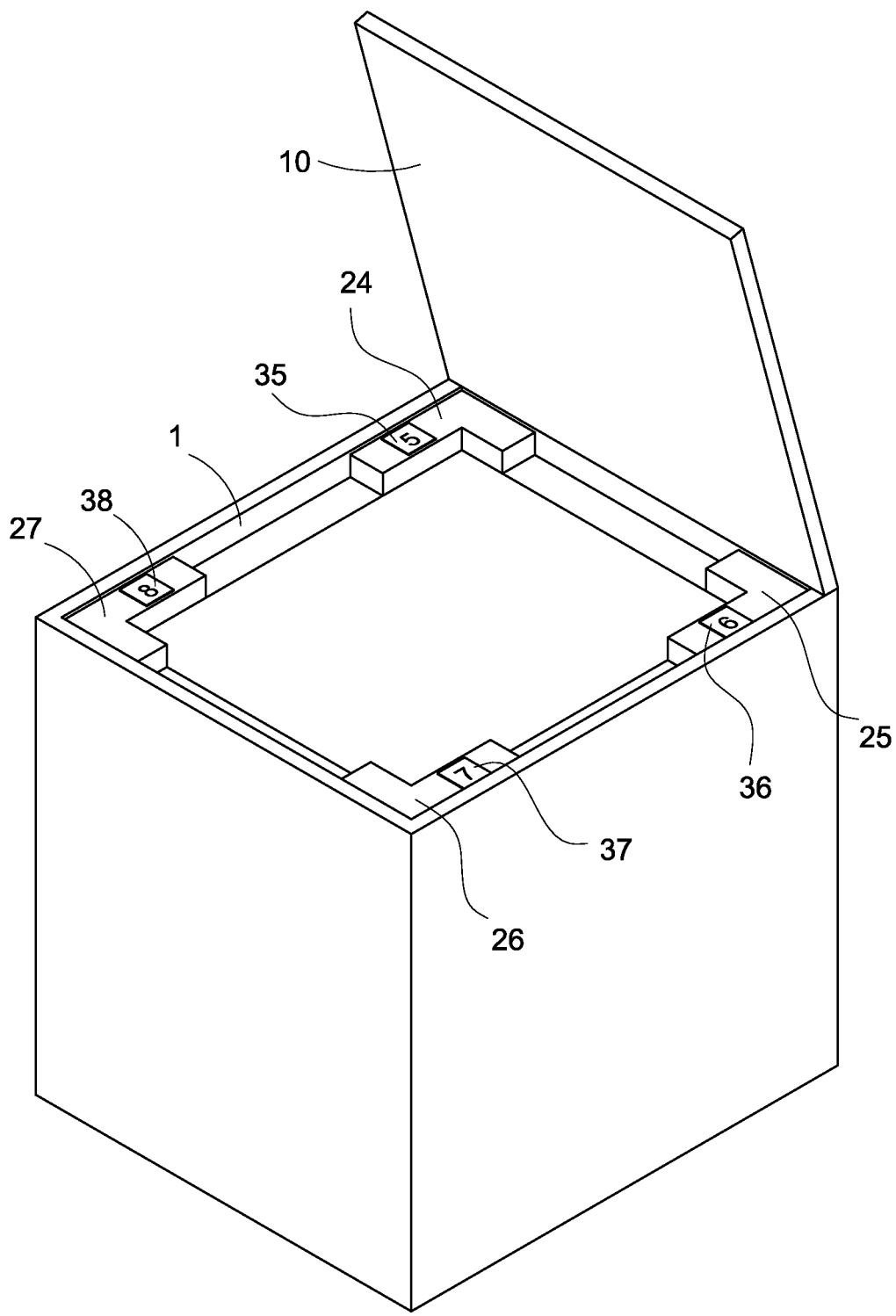
FIG. 1B is a perspective view of supporting materials of a second embodiment according to the present invention.

As shown in FIG. 1B, besides the inside of the device 1, one or more supporting materials 24, 25, 26, 27 (or called package materials) can also be arranged between the device 1 and an external package 10. The supporting materials 24, 25, 26, 27 fix the device 1 in the external package 10 and provide crackproof and shockproof ability.

Figure 2:
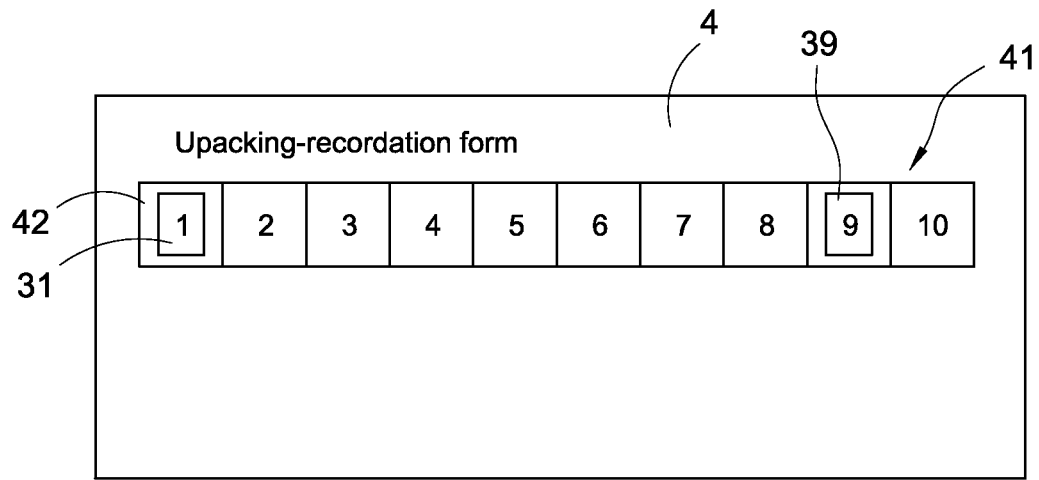
FIG. 2 is a perspective view of an unpacking recordation form of a first embodiment according to the present invention.

The main feature of the present invention is that the recording apparatus at least comprises the plurality of supporting materials 21-27, a plurality of labels 31-39 and an unpacking recordation form (as the unpacking recordation form 4 shown in FIG. 2). In this embodiment, an amount of the plurality of labels 31-39 is corresponding to an amount of the plurality of supporting materials 21-27 plus two (detailed described as following). As shown in FIG. 1A and FIG. 1B, for example, the amount of the plurality of supporting materials 21-27 is seven, and the amount of the plurality of labels 31-39 is nine (equal to seven plus two), but not limited thereto.

FIG. 2 is a perspective view of an unpacking recordation form of a first embodiment according to the present invention. The plurality of labels 31-39 comprises a starting-label, an ending-label and a plurality of recording labels, wherein an amount of the plurality of recording labels is equal to the amount of the plurality of supporting materials 21-27. Each of the plurality of labels 31-39 has a label number thereon respectively, and the plurality of label numbers is listed in order (for example, a numeral order or an alphabetic order).

In this embodiment, the label number of the starting-label is "1" (correspond to the label 31 in FIG. 2), the label number of the ending-label is "9" (correspond to the label 39 in FIG. 2), and the label numbers of the plurality of recording labels are "2" to "8" (correspond to the label 32-38 in FIG. 2). Each of the plurality of recording labels is pasted on the plurality of supporting materials 21-27 respectively during a packing procedure of the device 1.

As shown in FIGS. 1A and 1B, the supporting material 21 is pasted by the label 32 having a label number "2", the supporting material 22 is pasted by the label 33 having a label number "3", the supporting material 23 is pasted by the label 34 having a label number "4", the supporting material 24 is pasted by the label 35 having a label number "5", the supporting material 35 is pasted by the label 36 having a label number "6", the supporting material 26 is pasted by the label 37 having a label number "7", and the supporting material 27 is pasted by the label 38 having a label number "8". However, the above descriptions are just a preferred embodiment of the present invention, not intended to limit the scope thereof.

As shown in FIG. 2, the unpacking recordation form 4 comprises a pasted table 41, the pasted table 41 includes a plurality of columns 42. In this embodiment, each of the plurality of columns 42 has a column number thereon, and the plurality of column numbers is listed in order, and is according to the position of the plurality of columns 42 of the pasted table 41. For example, a first column of the pasted table 41 has a column number "1", a second column of the pasted table 41 has a column number "2", and so on. In this embodiment, an amount of the plurality of columns 42 is ten (with column number "1" to "10"), but not limited thereto.

The unpacking recordation form 4 is an independent form, attached in the external package 10 of the device 1, and being used during an unpacking procedure. However, in other embodiment, the unpacking recordation form 4 can be printed on the external package 10 directly, for example, printed on a cover or a bottom of the external package 10. Therefore, the user can record an unpacking progress by removing the labels 32-38 pasted on the supporting materials 21-27 to paste to the unpacking recordation form 4 during the unpacking procedure.

As shown in FIG. 2, the operators paste the starting-label and the ending-label of the plurality of labels 31-39 to corresponding columns of the unpacking recordation form 4 in advance before starting to pack the device 1. In particularly, the column numbers of the corresponding columns are corresponding to the label numbers of the starting-label and the ending-label. For example, the label 31 having the label number "1" is used as the starting-label, and is pasted to the column 42 having the column number "1" of the pasted table 41 in FIG. 2.

The operators then use the label 32 having the label number "2" as one of the plurality of recording labels, and paste the label 32 to one of the plurality of supporting materials 21-27, and further arrange the pasted supporting material (for example, the supporting material 21) into the device 1. Further, the operators use the label 33 having the label number "3" as one of the plurality of recording labels, and paste the label 33 to one of the supporting materials 22-27, and arrange the pasted supporting material (for example, the supporting material 22) into the device 1, and so on. If all of the supporting materials 21-27 are arranged completely, the labels 31-38 having the label numbers "1" to "8" have been used, and the operators use the label 39 having the label number "9" as the ending-label, and paste the label 39 to the column 42 having the column number "9" of the pasted table 41.

In this embodiment, the amount of the plurality of columns 42 is ten, and the amount of the plurality of labels 31-39 is nine, wherein the label 39 is the ending-label. To avoiding a misuse, a note can be filled on the column 42 having the column number "10" in advance during the packing procedure. For example, the note can be a strikethrough. Therefore, when the user receives the device 1 and checks the unpacking recordation form 4, he or she will see the column 42 having the column number "1" is pasted by the label 31, the column 42 having the column number "9" is pasted by the label 39, and the column 42 having the column number "10" is filled by the note.

As mentioned above, the user should unpack the supporting materials 21-27 from the device 1 during the unpacking procedure, and remove the labels 32-38 from the supporting materials 21-27 to paste to the corresponding columns 42 of the pasted table 41. If all columns 42 between the starting-label and the ending-label of the pasted table 41 (such as the seven columns 42 having the column number "2" to "8") are pasted by the corresponding labels 32-38 respectively, all of the supporting materials 21-27 in the device 1 are unpacked completely.

In particularly, the plurality of columns 42 between the starting-label and the ending-label of the pasted table 41 is recording columns, and an amount of the plurality of recording columns is equal to that of the plurality of recording labels. During the unpacking procedure, the user can determine if all of the supporting materials 21-27 in the device 1 are unpacked completely by checking if all of the recording columns are pasted by the corresponding labels 32-38 respectively. Excepting the plurality of recording columns, the column for pasting the starting-label, and the column for pasting the ending-label, all other columns 42 of the pasted table 41 are filled by the note, therefore, a misuse can be avoided. The note in this embodiment can be a strikethrough, but not intended to limit the scope of the present invention.

Figure 3A:
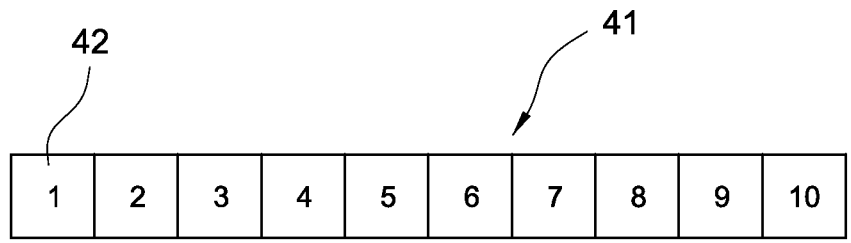
FIG. 3A is a perspective view of a pasted table of a first embodiment according to the present invention.
Figure 3B:
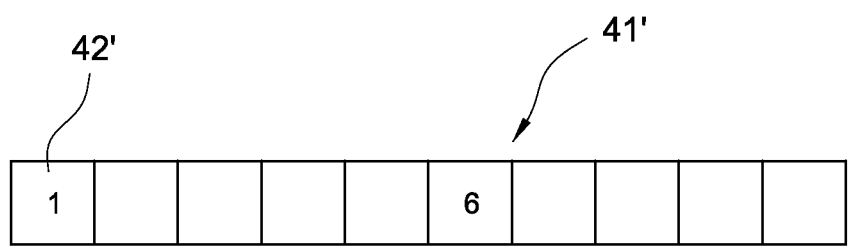
FIG. 3B is a perspective view of the pasted table of a second embodiment according to the present invention.

FIG. 3A is a perspective view of a pasted table of a first embodiment according to the present invention. FIG. 3B is a perspective view of the pasted table of a second embodiment according to the present invention. FIG. 3A shows the pasted table 41 mentioned above, which comprises the plurality of columns 42, and each column number of the columns 42 is listed in order. FIG. 3B shows other pasted table 41', which comprises a plurality of columns 42'. The difference between the pasted table 41 and the pasted table 41' is that only few columns 42' at a certain position of the pasted table 41' have a corresponding column number. As shown in FIG. 3B, only the first column and the sixth column 42' has the corresponding column number "1" and "6", therefore, the printing cost of the pasted table 41' will be reduced. However, the above descriptions are just a preferred embodiment, not intended to limit the scope of the present invention.

Figure 4A:
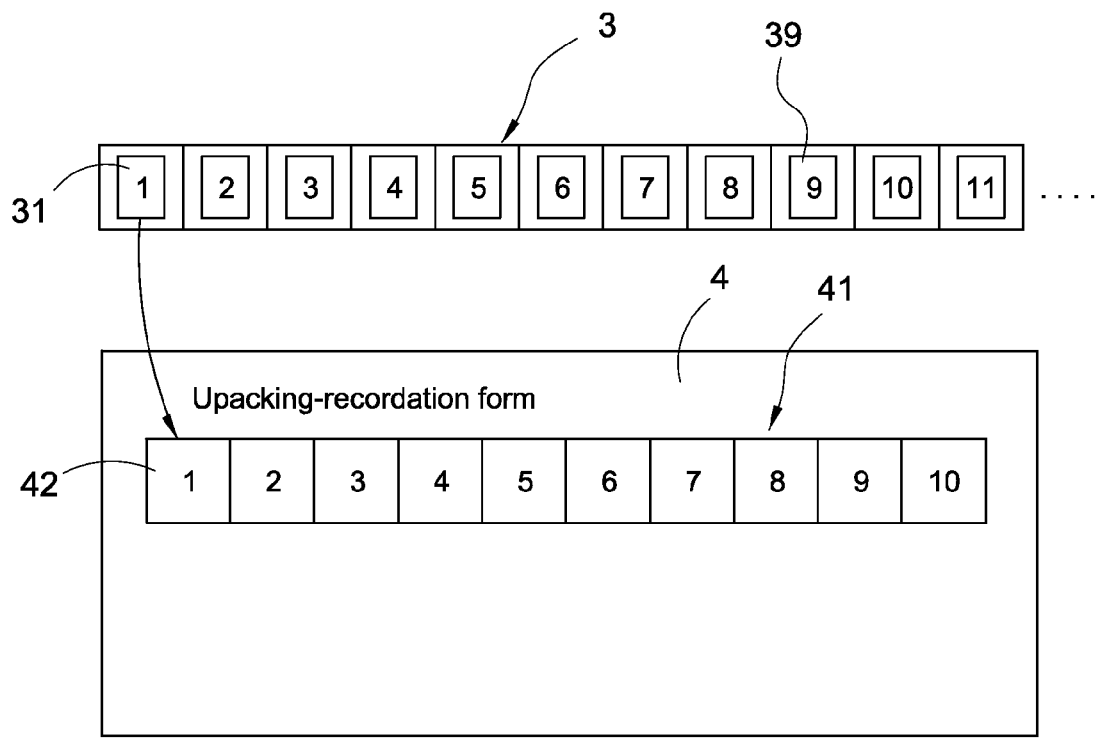
FIG. 4A is a perspective view of a first packing action of a first embodiment according to the present invention.
Figure 4B:
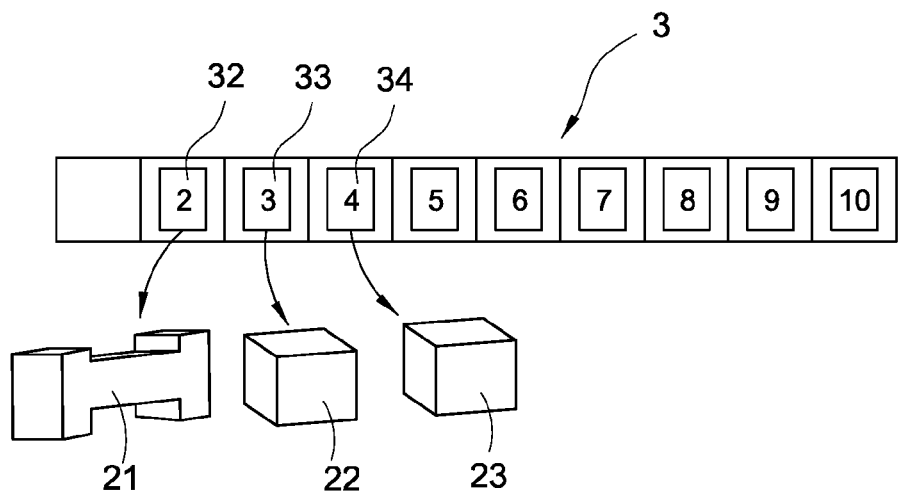
FIG. 4B is a perspective view of a second packing action of the first embodiment according to the present invention.
Figure 4C:
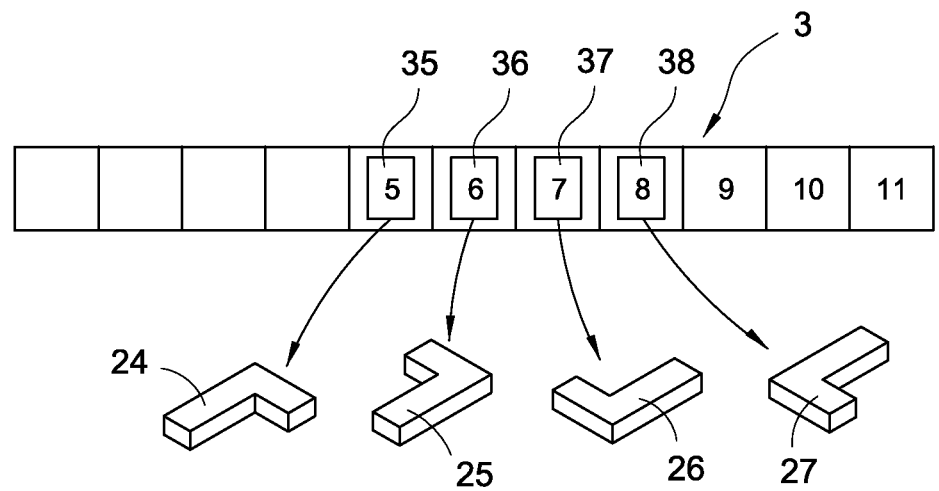
FIG. 4C is a perspective view of a third packing action of the first embodiment according to the present invention.
Figure 4D:
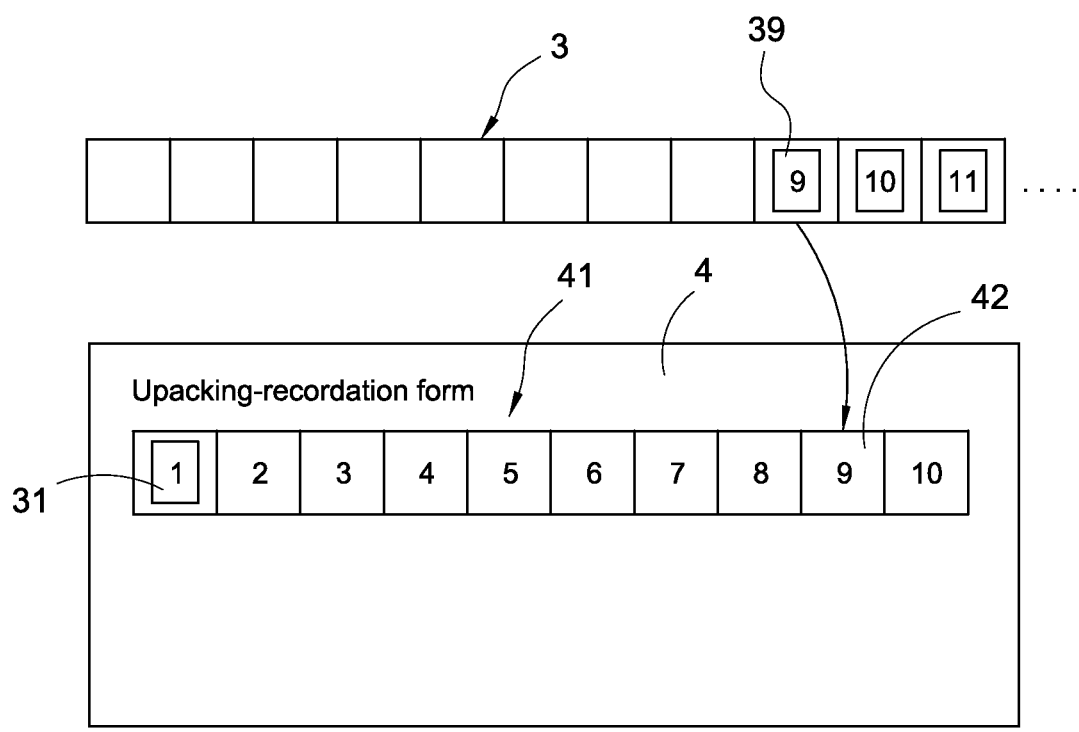
FIG. 4D is a perspective view of a fourth packing action of the first embodiment according to the present invention.
Figure 4E:
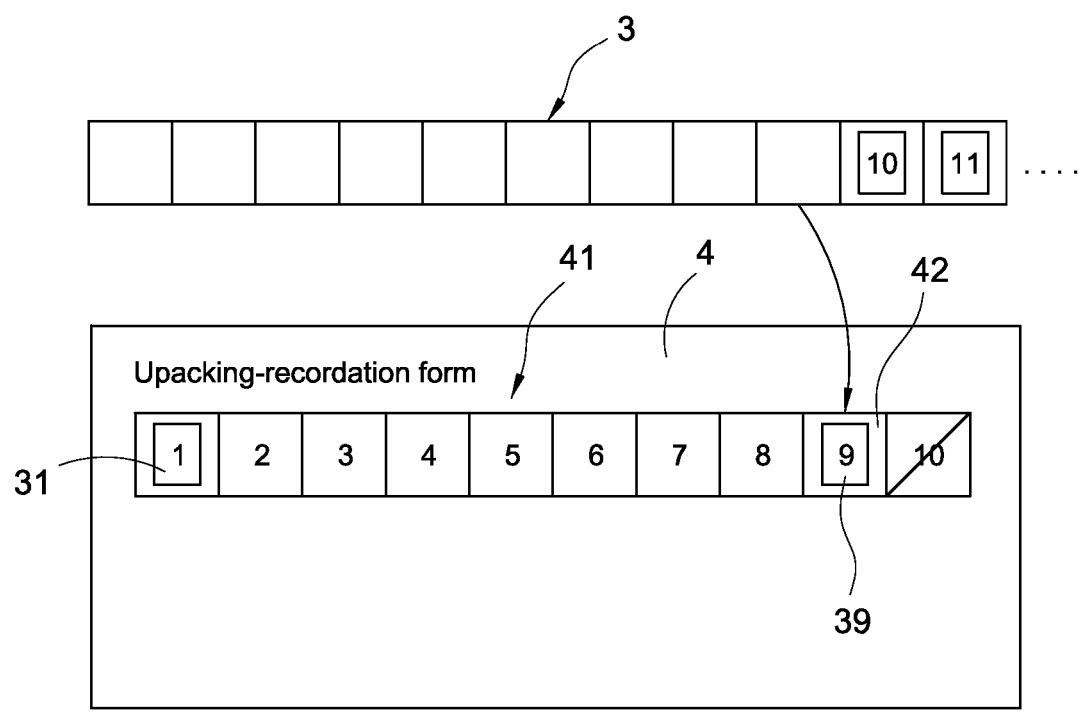
FIG. 4E is a perspective view of a fifth packing action of the first embodiment according to the present invention.
Figure 8:
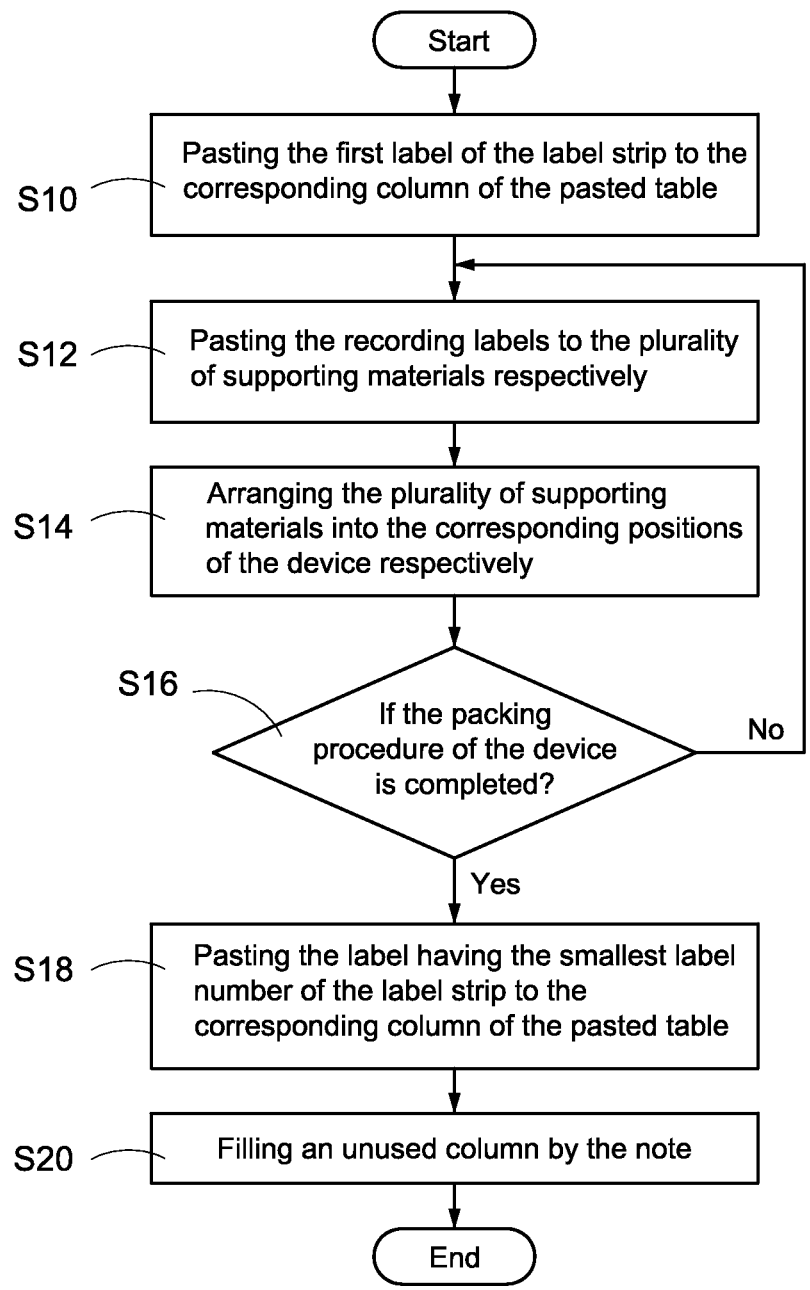
FIG. 8 is a flow chart of packing of a first embodiment according to the invention.

FIG. 8 is a flow chart of packing of a first embodiment according to the invention, and referring with FIG. 8, FIG. 4A is a perspective view of a first packing action of a first embodiment according to the present invention, FIG. 4B is a perspective view of a second packing action of the first embodiment according to the present invention, FIG. 4C is a perspective view of a third packing action of the first embodiment according to the present invention, FIG. 4D is a perspective view of a fourth packing action of the first embodiment according to the present invention, and FIG. 4E is a perspective view of a fifth packing action of the first embodiment according to the present invention.

Before starting the packing procedure for the device 1, the operators first remove a first label from a label strip 3, and paste the first label to a corresponding column of the pasted table 41 (step S10). The first label here is the label of the label strip 3 which has the smallest label number. In the embodiment shown in FIG. 4A, the first label of the label strip 3 has the column number "1". The operators use the label 31 as the starting-label, and paste the label 31 to the corresponding column 42 of the pasted table 41 which has the column number "1".

When arranging the supporting materials 21-27, the operators use the labels 32-38 as the recording labels, and remove the labels 32-38 from the label strip 3 respectively to paste to each of the plurality of supporting materials 21-27 (step S12). In the embodiment shown in FIG. 4B and FIG. 4C, the operator paste the labels 32-38 having the label number "2" to "8" respectively to the supporting materials 21-27 in order. In this embodiment, the amount of the plurality of supporting materials 21-27 is seven, and the amount of the plurality of recording labels is seven, in other words, the amount of the plurality of recording labels is according to the amount of the plurality of supporting materials 21-27.

After one of the plurality of supporting materials 21-27 is pasted by one of the plurality of labels 32-38, the pasted supporting material is then arranged into a corresponding position of the device 1 (step S14). In this case, the operators can determine if the packing procedure of the device 1 is completed or not by checking if there is any supporting material remains (step S16). If anyone supporting material remains, the operators re-execute the step S12 and the step S14. If there is no supporting material remains, the packing procedure of the device 1 is completed, in other words, the plurality of recording labels are pasted completely. In the meanwhile, the label remains on the label strip 3 which has the smallest label number is used as the ending-label.

In this embodiment, the label numbers of the plurality of recording labels are larger than the label number of the starting-label, and the label number of the ending-number is larger than the label numbers of the starting-label and the plurality of recording labels. In particularly, the smallest label number of the plurality of recording labels is larger than the label number of the starting-label by one, and the biggest label number of the plurality of recording labels is less than the label number of the ending-label by one.

After the step S16, the label remaining on the label strip 3 and having the smallest label number (such as the ending-label) is removed from the label strip 3 to paste to a corresponding column of the pasted table 41 (step S18). In the embodiment shown in FIG. 4D, the label 39 having the label number "9" is used as the ending-label, and is pasted to the column 42 having the column number "9" of the pasted table 41. The seven columns 42 between the column number "1" and "9" are used as the plurality of recording columns. If the user checks the unpacking recordation form 4, he or she can determine that the amount of the supporting materials needed to be unpacked is seven by seeing the label 31 and 39 pasted on the columns 42 having the column number "1" and "9" of the pasted table 41. In other words, the amount of the plurality of recording columns is seven, and the amount of the labels needed to be pasted to the plurality of recording columns is also seven.

It should be mentioned is, the amount of the plurality of columns 42 of the pasted table 41 can be set to a maximum. For example, if a company produces three products, wherein a product-A needs five supporting materials, a product-B needs ten supporting materials, and a product-C needs twenty supporting materials, in this case, the amount of the plurality of columns 42 should be twenty two. By this way, these three products can use the same unpacking recordation form 4 (the pasted table 41 thereon comprises twenty two columns 42), so as to reduce the package cost of the products, and simplify the packing procedure.

As shown in FIG. 4E, After all of the supporting materials 21-27 are arranged completely, and the ending-label is pasted to the corresponding column of the pasted table 41, some of the columns 42 maybe remain on the pasted table 41 (for example, the column 42 having column number "10" shown in FIG. 4E). In this case, the unused column needs to be noted (step S20), and the user can know that the noted column 42 is no necessary to be pasted any label. The unused column 42 in this embodiment is the columns of the pasted table 41 excepting the plurality of recording columns, the column for the starting-label, and the column for the ending-label.

Figure 5:
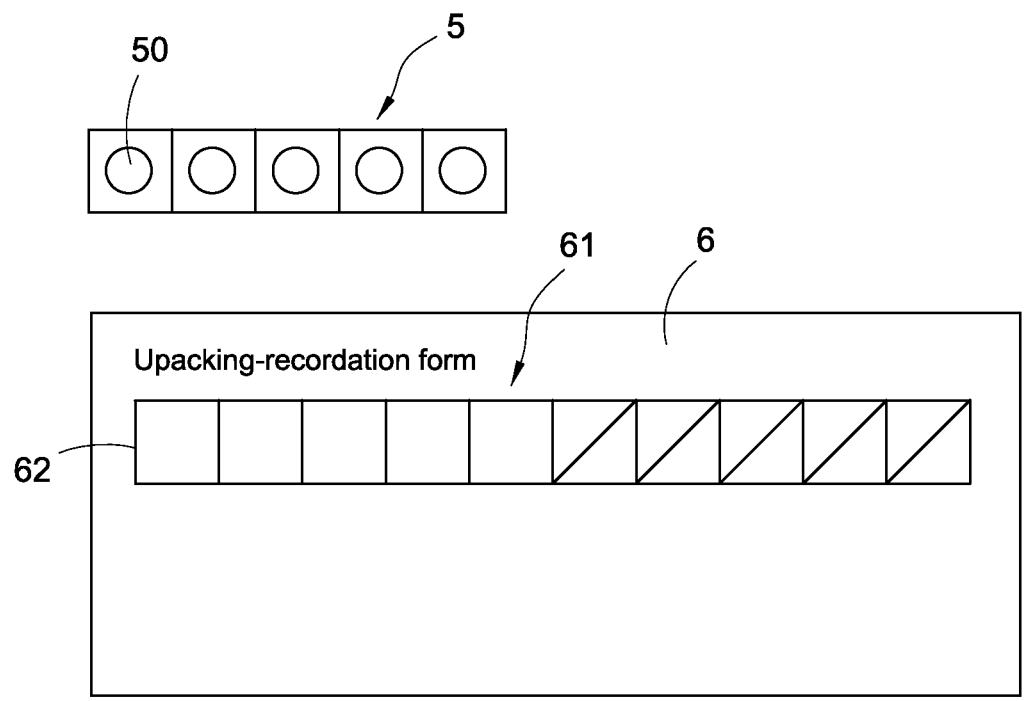
FIG. 5 is a perspective view of the pasted table of a third embodiment according to the present invention.

FIG. 5 is a perspective view of the pasted table of a third embodiment according to the present invention. In the above embodiments, the label numbers of the labels of the label strip 3 are listed in order, and the column numbers of the columns 42 of the pasted table 41 are also listed in order. FIG. 5 discloses other label strip 5 and other unpacking recordation form 6. The difference between the label strip 5 and the label strip 3 is the label strip 5 comprises a plurality of labels 50, and none of the plurality of labels 50 has the label number. The difference between the unpacking recordation form 6 and the unpacking recordation form 4 is the unpacking recordation form 6 comprises a pasted table 61, the pasted table 61 includes a plurality of columns 62, and none of the plurality of columns 62 has the column number.

In this embodiment, an amount of the plurality of labels 50 is larger than or equal to the amount of the plurality of supporting materials, and an amount of the plurality of columns 62 is also larger than or equal to the amount of the plurality of supporting materials. In particularly, the operators paste the plurality of labels 50 to the plurality of supporting materials respectively, and arrange the pasted supporting materials into the device 1 respectively during the packing procedure. After the arrangement of the supporting materials is finished, some of the plurality of columns 62 of the pasted table 61 should be retained, and some of them should be filled by the note (for example, the strikethrough), wherein the amount of the retained columns 62 is corresponding to the amount of the plurality of supporting materials.

For example, the amount of the plurality of supporting materials in FIG. 5 is five, and the amount of the plurality of labels 50 is at least five. Further, only five columns 62 are retained of the pasted table 61, and other columns 62 are filled by the note. In this embodiment, there is no need to use the starting-label and the ending-label, so the cost of the labels is reduced.

Figure 6A:
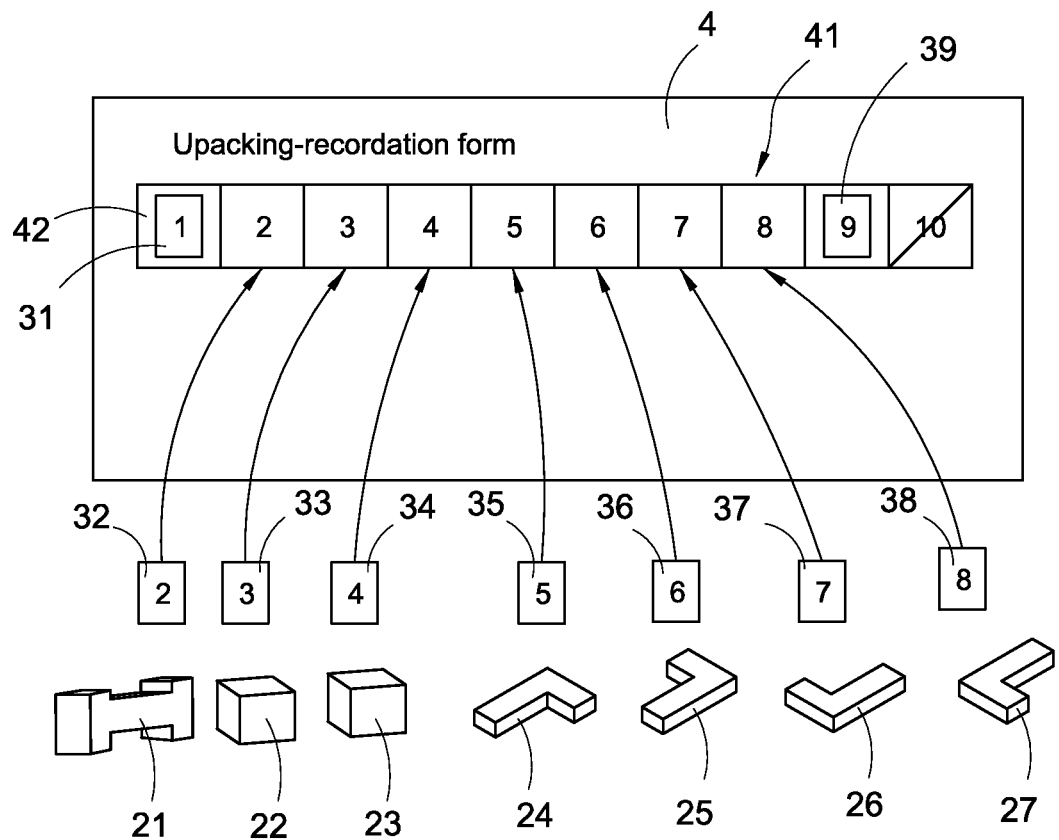
FIG. 6A is a perspective view of a first unpacking action of a first embodiment according to the present invention.
Figure 6B:
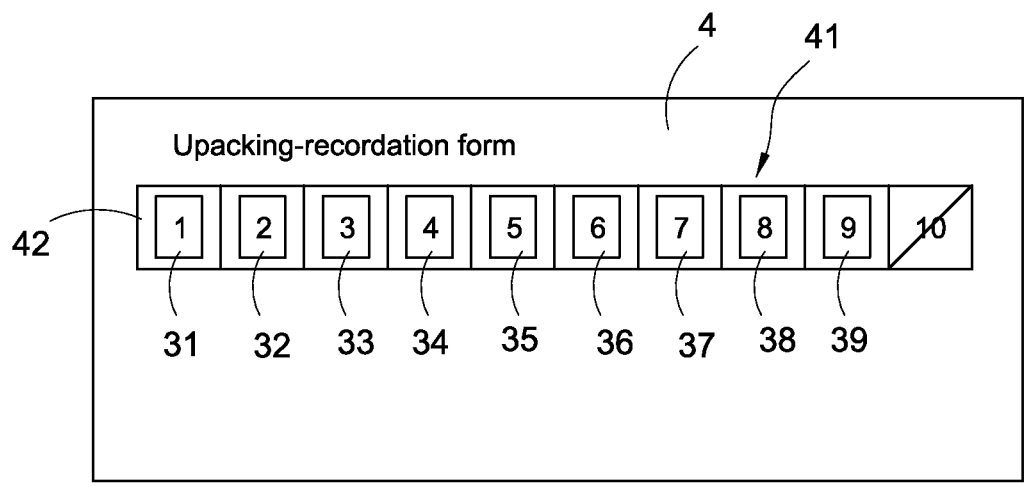
FIG. 6B is a perspective view of a second unpacking action of the first embodiment according to the present invention.
Figure 9:
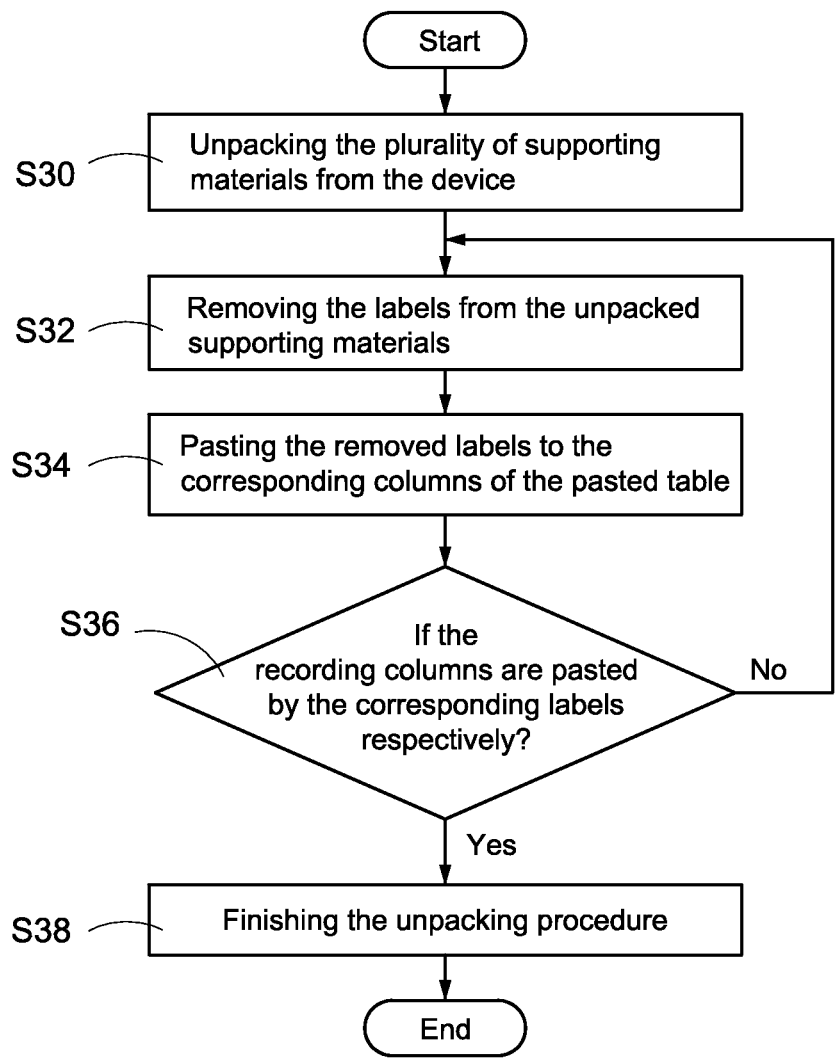
FIG. 9 is a flow chart of unpacking of a first embodiment according to the present invention.

FIG. 9 is a flow chart of unpacking of a first embodiment according to the present invention, and referring with FIG. 9, FIG. 6A is a perspective view of a first unpacking action of a first embodiment according to the present invention, FIG. 6B is a perspective view of a second unpacking action of the first embodiment according to the present invention.

After the user receives the device 1, he or she unpacks the supporting materials 21-27 from the device 1 (step S30), and removes the labels 32-38 from the unpacked supporting materials 21-27 (step S32), and further pastes the removed labels 32-38 to the corresponding columns 42 of the pasted table 41 respectively (step S34). Therefore, the user can record clearly that how many supporting materials is already removed. As shown in FIG. 6A, when the user unpacks the supporting material 21, he or she also removes the label 32 (having the label number "2") from the unpacked supporting material 21 to paste to the column 42 having the column number "2" of the pasted table 41. When the user unpacks the supporting material 22, he or she also removes the label 33 (having the label number "3") from the unpacked supporting material 22 to paste to the column 42 having the column number "3" of the pasted table 41, and so on. However, the plurality of supporting materials 21-27 do not have an unpacking order, and the labels 32-38 do not have a pasting order (for example, the label 32 can also be pasted to the supporting material 27 in other embodiment).

The user determines if the plurality of recording columns between the starting-label and the ending-label (in this embodiment, is the label 31 and 39 having the label number "1" and "9") of the pasted table 41 are pasted by corresponding labels respectively during the unpacking procedure (step S36). If no, the unpasted recording column indicates that there is at least one supporting material not unpacked yet, so the user needs to re-execute the step S30 to the step S36.

If all of the recording columns are pasted by the corresponding labels respectively (as shown in FIG. 6B), the pasted recording columns indicate that the plurality of supporting materials 21-27 in the device 1 are unpacked completely, and the unpacking procedure of the package is finished (step S38). Although the column 42 having the column number "10" is un-pasted, however, the amount of the plurality of supporting materials 21-27 is seven, and the amount of the labels 31-39 is nine, so the final step of the packing procedure is to fill the note on the column 42 having the column number "10". Therefore, the user is reminded by the note that the column 42 having column number "10" is no necessary to be pasted.

Figure 7:
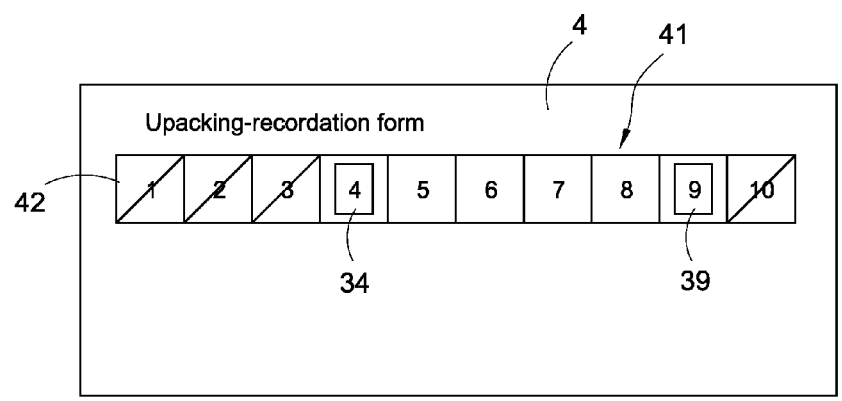
FIG. 7 is a perspective view of the unpacking recordation form of a second embodiment according to the present invention.

FIG. 7 is a perspective view of the unpacking recordation form of a second embodiment according to the present invention. In the foregoing embodiments, the label 31 having the label number "1" is used as the starting-label. Actually, the starting-label is the label remains on the label strip 3 which has the smallest label number. As shown in FIG. 7, for example, the smallest label number of the labels remain on the label strip 3 is "4" (in other words, the labels 31-33 having the label number "1" to "3" have been used), in this case, the operators use the label 34 having the label number "4" as the starting-label, and paste the starting-label to the corresponding column of the pasted table 41 (in this embodiment, is pasted to the column 42 having the column number "4").

In this embodiment, the amount of the plurality of supporting materials is four. The operators paste four labels having the label numbers "5", "6", "7", "8" to the four supporting materials respectively during the packing procedure of the device 1. In the end of the packing procedure, the operators use the label remains on the label strip 3 which has the smallest label number as the ending-label (the label 39 having the label number "9" shown in FIG. 7), and paste the ending-label to the column 42 having the column number "9" of the pasted table 41.

By way of the above technique, the starting-label and the ending-label do not need to have a specific label number. As a result, the operator can use the labels remained on the label strip 3 directly in the next packing procedure after the preceding packing procedure is finished. Therefore, the labels will not be wasted.

The user needs to remove the labels from the unpacked supporting materials, and pastes the removed labels to the corresponding columns of the pasted table 41 respectively, then the user can determine if all supporting materials in the device 1 are unpacked completely by checking if the plurality of recording columns between the starting-label and the ending-label of the pasted table 41 are pasted by the corresponding labels. In other embodiment, if the operators use the labels 50 which do not have the label number, and use the columns 62 which do not have the column number, the user can still determine if all supporting materials in the device 1 are unpacked completely by checking if all columns 62 of the pasted table 61 which do not filled by the note are pasted by the labels 50. The present invention helps the user to avoid missing any supporting materials of the device 1, and causes the device 1 cannot work normally after booting, or damaged because of the supporting materials remain in the device 1.

As the skilled person will appreciate, various changes and modifications can be made to the described embodiment. It is intended to include all such variations, modifications and equivalents which fall within the scope of the present invention, as defined in the accompanying claims.

What is claimed is:

1. A recording apparatus and system, comprising:
   a plurality of supporting materials arbitrarily arranged in a device to support and to fix components in the device, and also arbitrarily arranged between the device and an external package to fix the device in the external package during a packing procedure of the device;
   a plurality of recording labels, an amount of the plurality of recording labels being equal to an amount of the plurality of supporting materials, and each of the recording labels being pasted on each of the plurality of supporting materials respectively;
   an unpacking recordation form comprising a pasted table, and the pasted table including a plurality of columns;
   a starting-label and an ending-label pasted in different columns of the pasted table, wherein the pasted table retains a plurality of columns, and an amount of the plurality of retained columns is equal to the amount of the plurality of labels and the amount of the plurality of supporting materials;
   wherein an unpacking progress is recorded by removing the labels from the supporting materials and pasting the labels to the unpacking recordation form during an unpacking procedure.

2. The recording apparatus according to claim 1, wherein the starting-label, each of the plurality of recording labels, and the ending-label have a label number respectively and the plurality of label numbers is listed in order, wherein each of the plurality of columns has a column number respectively and the plurality of column numbers is listed in order.

3. The recording apparatus according to claim 2, wherein the plurality of label numbers is listed in a numeral order.

4. The recording apparatus according to claim 2, wherein the plurality of label number is listed in an alphabetic order.

5. The recording apparatus according to claim 1, wherein the pasted table is filled by a note.

6. The recording apparatus according to claim 5, wherein the note is a strikethrough.

7. The recording apparatus according to claim 1, wherein the unpacking recordation form is printed on an external package of the device.

8. A recording apparatus and system, comprising:
   a plurality of supporting materials arbitrarily arranged in a device to support and to fix components in the device, and also arbitrarily arranged between the device and an external package to fix the device in the external package during a packing procedure of the device;
   a plurality of labels, an amount of the plurality of labels being equal to an amount of the plurality of supporting materials, and each of the labels being pasted on each of the plurality of supporting materials respectively; and
   an unpacking recordation form comprising a pasted table and a note, and the pasted table including a plurality of columns, wherein the pasted table retains a plurality of columns, and an amount of the plurality of retained columns is equal to the amount of the plurality of labels and the amount of the plurality of supporting materials;
   wherein an unpacking progress is recorded by removing the labels from the supporting materials and pasting the labels to the unpacking recordation form during an unpacking procedure.

9. The recording apparatus according to claim 8, wherein the note is a strikethrough.

10. The recording apparatus according to claim 8, wherein the unpacking recordation form is printed on an external package of the device.

* * * * *